Aug. 8, 1933.  C. A. LINDSAY  1,921,979
SCALE
Filed Oct. 7, 1932   2 Sheets-Sheet 2

TRANSVERSE LEVER OF SCALE.

Inventor,
C. A. Lindsay,
By Henry E. Stauffer
His Attorney

Patented Aug. 8, 1933

1,921,979

UNITED STATES PATENT OFFICE.

1,921,979

SCALE

Clarence A. Lindsay, Washington, D. C.

Application October 7, 1932. Serial No. 636,735

6 Claims. (Cl. 265—53)

The invention relates more particularly to platform scales, such as motor truck scales, railroad scales and industrial scales, although it is not limited to scales of these particular classes.

The object of my invention is to provide means to multiply the normal weight indication of a scale for the purpose of making tests for accuracy whereby any error in the lever system will be multiplied also and the indicating element will thus show clearly any adjustment required to correct the scale.

Another object of my invention is to facilitate making correct adjustments far within the official tolerance for the scale through aid of the magnified or multiplied weight indication of the error.

Another object of my invention is to reduce the labor, time, and expense for scale tests and adjustment service.

In general, these results are accomplished by so changing the ratio of the lever system of the scale that a test weight load of given value will indicate any desired multiple of the normal indication for the test weight load employed.

The change in the lever system may be made in any one or more of the available levers used in scales, but it is preferred to change one of the levers that is easily accessible, for instance the shelf lever which is usually employed just below the shelf upon which the scale weighbeam is mounted. In scales where this shelf lever is not used some other lever of the system may be changed; or an additional lever may be introduced, to multiply the normal weight indication of the scale for the purpose of making tests and to facilitate making adjustments for accuracy.

In established practice, the testing of scales of large capacity involves the transportation and handling a large number of standard weights which vary in size from 50 pounds to as much as 500 or 1000 pounds each; and these weights must be sufficient in number to equal the capacity of the scale, or the capacity for which it is used. In scales used for weighing commercial trucks, it is at once seen that the transportation and handling of these weights is a matter of considerable magnitude; and in the testing of industrial scales designed to weigh large masses, the problem is still more involved. By my invention, since the weight indication has been greatly increased the weights necessary for effective testing of the scale may be greatly reduced.

The shelf lever, as employed in most scales, is what is known in mechanics as a lever of the second class; that is, one in which the fulcrum is at one end, the power at the other, and the weight between them. And since the weight is usually applied in the middle of the lever, the effective ratio of this lever of two to one is used to illustrate the invention. Other ratios may be employed.

I propose to use such a shelf lever, but I provide it with an additional fulcrum pivot, and so change the connections and the mounting of this lever that it shall function as a lever of the third class; that is, one in which the fulcrum is at one end, the weight at the other, and the power between them.

In practice, the identical shelf lever which is normally used is provided with an additional pivot, and remounted to effect the new result; but a separate lever having the desired construction may be used in testing. It is immaterial which course is followed; but I prefer to use the same lever in testing as I use in weighing, and simply remount the lever in the manner described.

Referring to the accompanying drawings.

Figure 1:
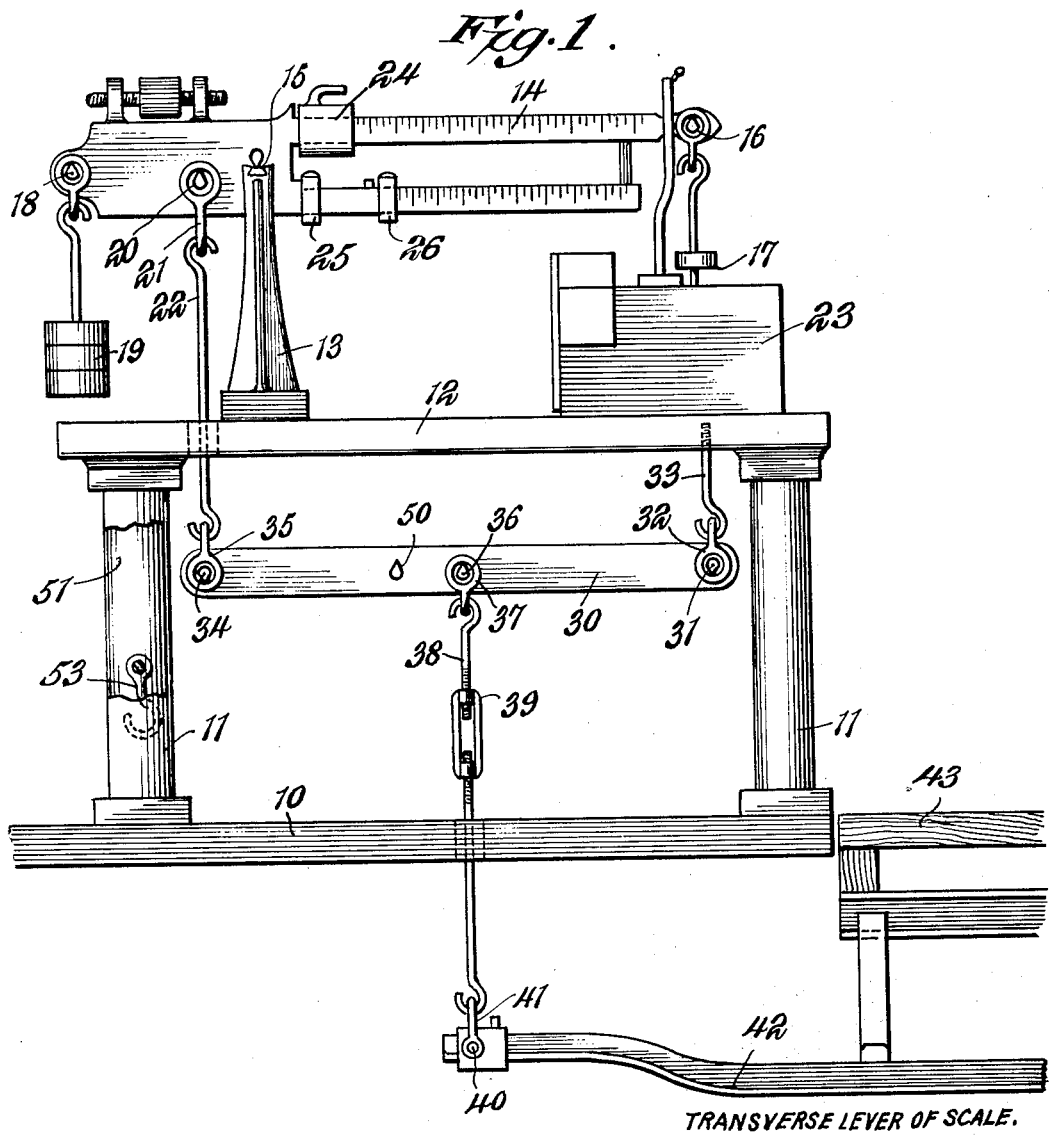
Fig. 1 is a front view of a standard scale, the platform being partly broken away.

Referring to the drawings more in detail, and particularly to Fig. 1 thereof, the numeral 10 indicates the floor upon which the scale indicating devices are mounted. Secured to the floor are pillars 11, and upon these is mounted the weighbeam shelf 12. This shelf carries a fulcrum stand 13 upon which is pivoted a standard weighbeam 14, carrying a pivot 15 which rests upon the fulcrum stand. This weighbeam carries at its front end the pivot 16 upon which is suspended the usual counterpoise 17. The weighbeam 14 at its other end carries a pivot 18 from which is hung a back balance weight 19, as is usual in such constructions. Between the fulcrum 15 and the pivot 18, there is another pivot 20, from which is suspended a clevis 21, supporting a beam rod 22 which is connected to the lever system of the scale. A well known automatic indicating element is shown at 23. This may or may not be used as preferred. Poises 24, 25 and 26 are standard with scales of this type and need no further description.

Beneath the weighbeam shelf 12, or at some other convenient place, is a lever 30. This lever at one end is provided with a pivot 31 supported in a clevis 32, which in turn is supported by the fulcrum hook 33 secured in the weighbeam shelf 12. At the other end the lever 30 is provided with another pivot 34 which rides in a clevis 35, which in turn is secured to the beam rod 22. At the middle point the member 30 is provided with a load pivot 36 on which is hung a clevis 37, which in turn supports one end of a connecting rod 38 and turnbuckle 39. The lower end of this rod is provided with a hook which engages a clevis 41 supported by a pivot 40 in the end of the transverse lever 42 of the scale. The platform of the scale is shown at 43, partly broken away.

Figure 2:
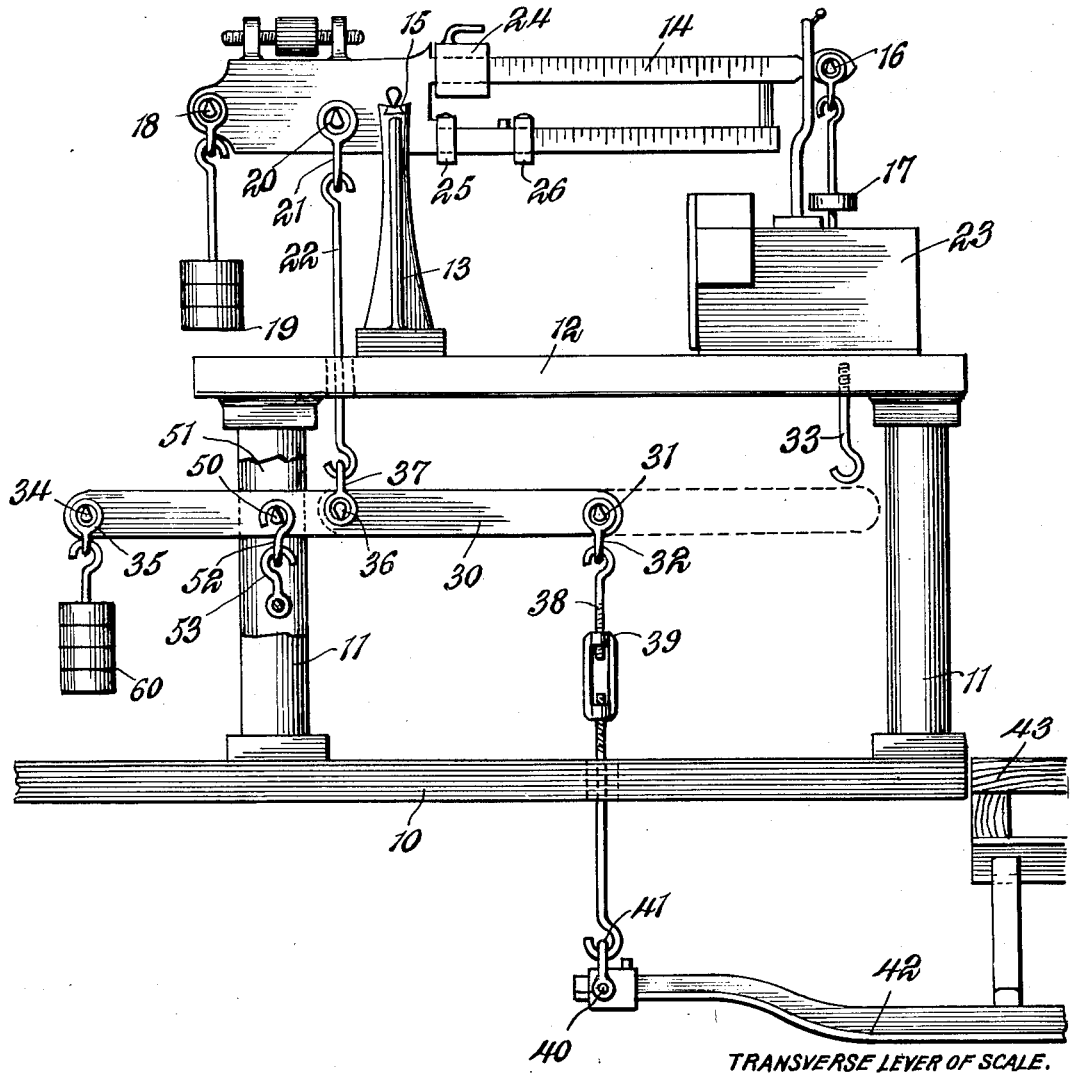
Fig. 2 is a similar view of the same scale, showing my invention as applied thereto, the platform again being partly broken away.

The lever 30 is provided with still another pivot 50. This is a permanent part of the lever, but is not in use when the scale is arranged for normal operation, as in Fig. 1. It functions only when the scale is arranged for testing in accordance with this invention, and as shown in Fig. 2. The pivot 50 bears some certain definite relation to the pivots 31 and 36. In the ratio here adopted, the distance from the pivot 31 to the pivot 36 is just five times the distance between the pivots 36 and 50. This carries out the ratio of the parts adopted in the form illustrated. It is understood, however, that this ratio is merely illustrative, and others may be substituted therefor.

As the lever 30 is mounted as shown in Fig. 1, it is a lever of the second class; that is, the fulcrum is at 31, the power is applied at 34, and the weight is hung between them on the pivot 36. And since the pivot 36 is just half way between the pivots 31 and 34, a given power applied at 34 had a lifting value of twice this amount at 36.

Reference will now be made to Fig. 2, which shows the lever mechanism changed to make a test of the scale in accordance with my invention. The reference characters used are the same as those employed in connection with Fig. 1, in so far as the same are applicable.

It will be noticed that in this figure the shelf lever 30 has been disconnected bodily and moved to the left and connected in a totally different manner, and is now a lever of the third class, the fulcrum being near one end at 50, the load at the other end on the pivot 31, and the power between them applied at the pivot 36. Moreover the lever has been turned over, so that what was formerly the top is now the bottom. The lever has been disconnected from the hook 33, and now occupies a position to the left of that shown in Fig. 1, having been passed through an opening 51 in the pillar 11. The beam rod 22 is now coupled to the clevis 37, supported by the pivot 36. The pivot 50, which has no function with the connections as shown in Fig. 1, now becomes the fulcrum of the lever, and is supported by a clevis 52, which is engaged by a fulcrum hook 53, secured to the pillar 11 in any convenient way. At the left hand end of the lever, the clevis 35 supports ordinary back balance weights 60.

Instead of using the same lever in testing as is used in weighing, and changing its position and connections, of course, a second and different lever having the necessary construction may be substituted therefor.

Operation

Inasmuch as the description is quite full and complete, no prolonged statement of operation is necessary. A short description, however, may aid in an understanding of the invention.

With the parts as shown in Fig. 1, weighing takes place in the usual way; the weight on the platform 43 transmitting movement to the transverse lever 42, and from this through the lever 30 to the weighbeam 14. It is here balanced by poise weights in the usual way, and the weight read off directly from the weighbeam of the scale, or by the aid of some special indicating device as shown at 23.

In testing the scale in the usual way, with the parts as shown in Fig. 1, test weights are placed on the platform, and the accuracy of the scale is indicated by the position of the poises on the weighbeam. The value of the weights on the platform being known, the reading on the scale should indicate the sum of these known weights; and if it does not do so, the scale is out of adjustment, and must be corrected to bring the indication to what it should be.

To test the scale in accordance with my invention, the lever 30 is disconnected from the supports as shown in Fig. 1 and mounted and connected as shown in Fig. 2; or a different lever having the same construction is substituted therefor. And inasmuch as the pivot 31 and the pivot 36 now support the elements that operate reversely from the manner shown in Fig. 1, the lever 30 must be turned over so that the part which formerly constituted the top of the lever now forms the bottom thereof; or if a different lever is used, it must be mounted with the pivots arranged as shown in this figure. The pivot 50, which performs no function when the parts are mounted for normal weighing, as shown in Fig. 1, now becomes the fulcrum of the lever; and the clevis 52, which is connected to the fulcrum hook 53, supports the lever on its fulcrum 50.

Now, if test weights be placed on the platform 43, and the weighbeam brought to balance, the indications on the weighbeam will be greater than in ordinary use; and with the levers proportioned as here described, the weighbeam indication will be ten times the correct weight, the proportions of the parts having been selected to give a ten fold indication. Any other ratio may be used.

This operation may be further illustrated by the following example, which of course is intended merely as an illustration.

With the lever system of the scale assembled with a shelf lever as a class two lever having the ratio two to one, for weighing service, a test weight load of one thousand pounds should show a weight indication of one thousand pounds on the weighbeam of the scale.

With the lever system of the scale assembled for test and the shelf lever changed to a class three lever, having a ratio of five to one, the effective multiplication of the normal weight indication of the scale equals ten to one for the test service. With the parts changed in this manner, one thousand pounds of test weight load on the platform of the scale will now show a weight indication of ten thousand pounds on the weighbeam of the scale for the particular test load employed; that is, the indication on the weighbeam will be ten times the normal indication.

Should the lever system of the scale contain either a plus or minus error, for instance two pounds in one thousand pounds, this error will be multiplied also. When the shelf lever is assembled for testing (to function as a class three lever as described above) the normal indication for the error is also multiplied ten times. Therefore, when one thousand pounds of test weight load is placed on the platform of the scale, the weight indication will show ten thousand twenty pounds for a plus error of twenty pounds in the weight indication, or nine thousand nine hundred and eighty pounds for a minus error of twenty pounds in the weight indication, or ten times the normal weight indication of load and the plus or minus error multiplied ten times.

In this example, the official tolerance limit of two pounds per thousand has been used. Therefore, when the multiplied indication of the error is within twenty pounds, then the scale is within official tolerance for accuracy which is two pounds for this example. But a skilled mechanic can more readily adjust the scale for correct indication with the weight indication multiplied than with the weight indication normal. Therefore, the scale mechanic by this arrangement can correct or seal the scale far within official tolerance for close weighing.

What I claim is:

1. In a scale, a platform adapted to receive test weights of known value, indicating means by which the value of the weights may be indicated, a lever system including a lever of the second class for transmitting the force of the load on the platform to the indicating means, and means for substituting a lever of the third class for the lever of the second class, whereby the value of the test weights is multiplied on the indicating means.

2. In a scale, a platform adapted to receive test weights of known value, indicating means by which the value of the weights can be indicated, a lever system including a lever of the second class in which the work is applied half way between the fulcrum and the point of application of the power, and means for substituting for said lever of the second class a lever of the third class in which the distance from the point of application of the work to the point of application of the power is five times the distance from the fulcrum to the point of application of the power, whereby the effect of the test weights on the indicating means is increased ten times and by which any error in the lever system is increased in the same ratio.

3. In a scale, a platform adapted to receive test weights of known value, indicating means by which the value of the weights may be indicated, a lever system for transmitting movement of the platform to the indicating means, the system including a lever having pivots by which it may be selectively connected in the lever system so as to vary the effect of the system, in one position for normal weighing service and in another to vary the reading for test purposes.

4. In a scale, a platform adapted to receive test weights of known value, indicating means by which the value of the weights may be indicated, a lever system for transmitting movement of the platform to the indicating means, the system including a lever having pivots by which it may be selectively connected in the lever system so as to vary the effect of the system and operate as a lever of the second class for normal weighing operations or a lever of the third class for testing purposes.

5. In a scale, a platform adapted to receive a test load of known value, indicating means by which the value of the load may be indicated, a lever system between the platform and the indicating means, the system including a lever having two sets of pivots where the lever may be connected so as to transmit a normal indication of the test load to the indicating means, or transmit a multiplied indication of the test load upon the platform.

6. In a scale, a platform adapted to receive test weights of known value, indicating means by which the value of the test weights may be indicated, a lever system between the platform and the indicating means, one lever of the system having pivots by which it may be connected so as to transmit to the indicating means the correct indication of the weights on the platform, or be so connected as to transmit to the indicating means a magnified reading of the test weights on the platform.

CLARENCE A. LINDSAY.